(12) United States Patent
Lin

(10) Patent No.: US 6,382,043 B1
(45) Date of Patent: May 7, 2002

(54) TRANSMISSION ASSEMBLY FOR A BICYCLE HAVING FORWARD/BACK GEAR

(76) Inventor: Ruey-chieh Lin, 8 Floor, No. 108-2, Kuan Fu Road Sec. 1, Fengshan, Kaohsiung Hsien (TW)

( * ) Notice: Subject to any disclaimer, the term of this patent is extended or adjusted under 35 U.S.C. 154(b) by 20 days.

(21) Appl. No.: 09/632,612

(22) Filed: Aug. 4, 2000

(51) Int. Cl.$^7$ .................... F16H 3/34; F16H 33/20; B62M 1/04
(52) U.S. Cl. .................... 74/354; 74/143; 74/355; 280/252; 280/255; 280/258
(58) Field of Search .................... 74/143, 384, 354, 74/355; 280/282, 252, 253, 255, 258

(56) References Cited

U.S. PATENT DOCUMENTS

| | | | |
|---|---|---|---|
| 913,445 A | * 2/1909 | Woods | 74/355 |
| 996,189 A | * 6/1911 | Wood | 74/355 |
| 2,023,889 A | * 12/1935 | Kramps | 280/252 |
| 4,445,701 A | * 5/1984 | Stroud | 280/258 X |
| 4,467,668 A | * 8/1984 | Tatch | 280/255 |
| 4,630,839 A | * 12/1986 | Seol | 280/255 |
| 5,351,575 A | * 10/1994 | Overby | 74/143 X |
| 5,390,773 A | * 2/1995 | Proia | 280/253 X |
| 5,716,069 A | * 2/1998 | Bezerra et al. | 280/253 X |

FOREIGN PATENT DOCUMENTS

GB 2044194 * 10/1980 ................ 280/255

* cited by examiner

Primary Examiner—Charles A Marmor
Assistant Examiner—Ha Ho
(74) Attorney, Agent, or Firm—Bacon & Thomas, PLLC

(57) ABSTRACT

A bicycle transmission assembly comprises a gear shifting device and a reciprocating pedal device that are mounted to a bicycle frame. The reciprocating pedal device comprises a reverse gear train consisting of a first reverse gear and a second reverse gear to make two pedal rods move horizontally and reciprocatingly. Swaying movements of the pedal rods drive a single direction gear mechanism. The gear shifting device comprises a first idler gear and a second idler gear that are meshed with each other. A follower gear and the first idler gear are coaxially mounted with each other. The follower gear is connected to a single direction gear of the reciprocating pedal device via a transmission element. Pivotal movements of a gear shifting lever cause rotational movements of the carrier member such that the first idler gear or the second idler gear is meshed with a transmission gear to thereby drive the wheels of the bicycle. Selective engagement of the transmission gear with the first idler gear or the second idler gear upon manual operation of the gear shifting lever controls the rotating direction of the transmission gear, thereby controlling forward or rearward rotations of the wheels of the bicycle.

2 Claims, 6 Drawing Sheets

US 6,382,043 B1

TRANSMISSION ASSEMBLY FOR A BICYCLE HAVING FORWARD/BACK GEAR

BACKGROUND OF THE INVENTION

1. Field of the Invention

The present invention relates to a transmission assembly for a bicycle for leisure purpose, and more particularly to a transmission assembly for a bicycle having forward/back gear operated by a pair of reciprocating pedals.

2. Description of the Related Art

Taiwan Utility Model Publication No. 333178 issued on Jun. 1, 1998 and entitled "TRANSMISSION IMPROVEMENT FOR BICYCLES" discloses a bicycle frame having a guard plate mounted to each of two ends of a front chain wheel shaft. A shaft block is inserted into a central axle hole of each guard plate and is fixed to the front chain wheel shaft by a pin. A semi-circular weight is screwed into one of the guard plates and includes a seat embedded in an offset position. The seat is screwed into the weight by a tri-claw like fixing frame. A pedal mechanism consisting of a link and a pedal is securely mounted in the seat. Thus, the pedal mechanism is provided in an offset manner. In addition, a second pedal mechanism is provided to the other guard plate. The two pedal mechanisms are arranged to have a phase difference of 180°. By means of arrangement of the weights and the offset pedal mechanisms, inertial motions and gravitational accelerating motions are provided. Nevertheless, the pedals must be rotated to empower the pedal mechanisms, and this requires the cyclist to make larger movements. Smaller movements of the cyclist are required for rearward movement of the bicycle and the empowerment to the pedal mechanisms by means of rotating the pedals does not fit. Larger movements of the cyclist for rotating the pedals do not allow the cyclist to turn around easily for viewing the situation behind him/her and might be unable to control the rearward movement of the bicycle.

SUMMARY OF THE INVENTION

It is the primary object of the present invention to provide a bicycle with reciprocating pedals for providing forward/back gear such that the cyclist may turn around to see the situation behind him/her. Thus, the bicycle can be moved backward under a safer condition to thereby provide leisure and sporting effects.

In accordance with the present invention, a bicycle transmission assembly comprises a gear shifting device and a reciprocating pedal device that are mounted to a bicycle frame. The reciprocating pedal device comprises a reverse gear train consisting of a first reverse gear and a second reverse gear that are meshed with each other. Each reverse gear is connected via a torque rod and a link to a mediate portion of an associated pedal rod. The reverse gears rotate in reverse directions so as to make the pedal rods move horizontally and reciprocatingly. Swaying movements of the pedal rods drive a single direction gear mechanism to make a single direction gear of the single direction gear mechanism rotate in only one direction.

The gear shifting device comprises a first idler gear and a second idler gear that are meshed with each other and both carried by a carrier member. A follower gear and the first idler gear are coaxially mounted with each other. The follower gear is connected to the single direction gear of the reciprocating pedal device via a transmission element. The carrier member includes a shaft that is rotatably supported by the bicycle frame. The carrier member is connected to a gear shifting lever via an arm and a link. Pivotal movements of the gear shifting lever cause rotational movements of the carrier member such that the first idler gear and the second idler gear are turned about the axis of the shaft of the carrier until the first idler gear or the second idler gear is meshed with a transmission gear to thereby drive the wheels of the bicycle. Selective engagement of the transmission gear with the first idler gear or the second idler gear upon manual operation of the gear shifting lever controls the rotating direction of the transmission gear, thereby controlling forward or rearward rotations of the wheels of the bicycle.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENT

Figure 1:
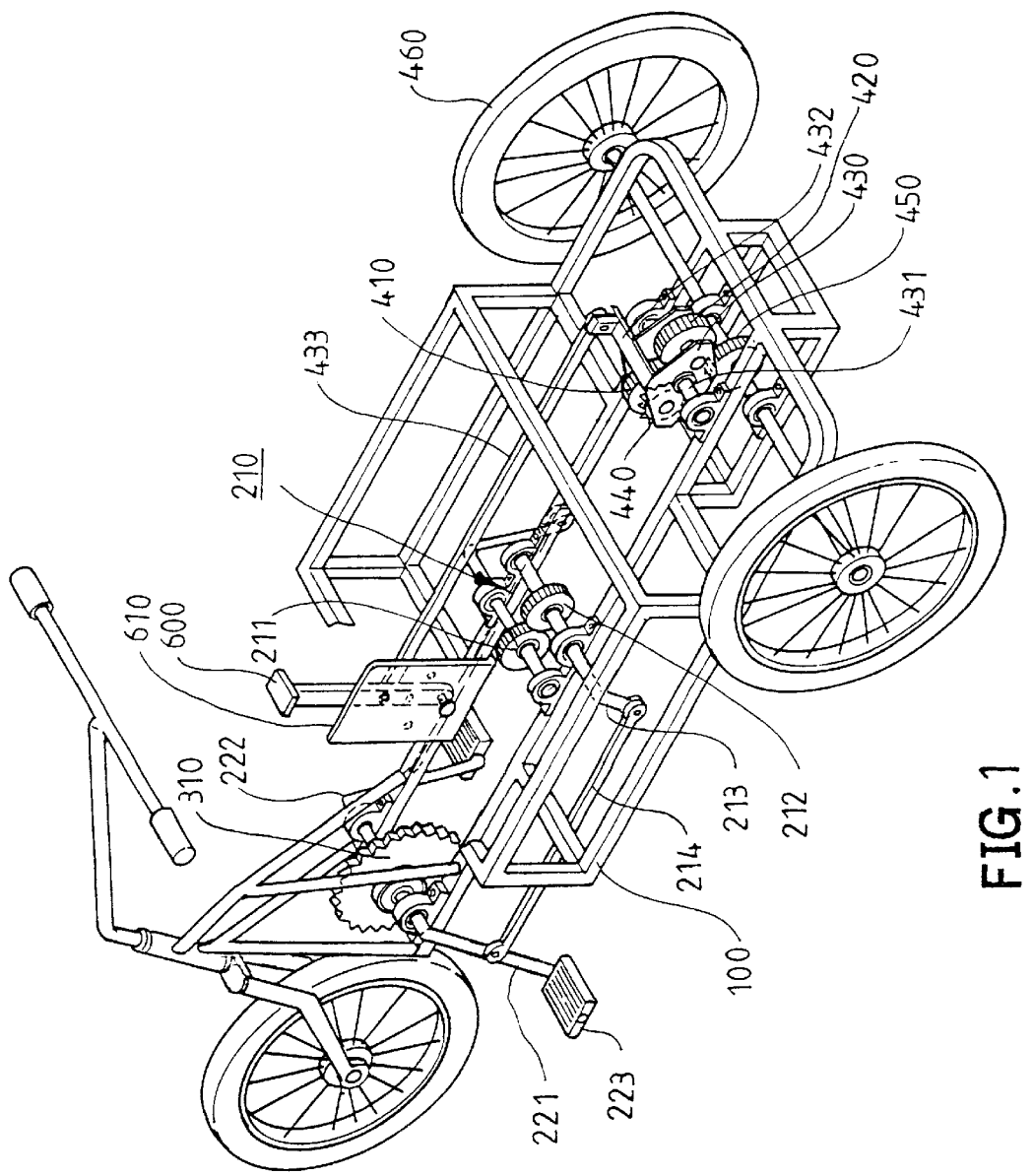
FIG. 1 is a perspective view of a bicycle transmission assembly in accordance with the present invention.
Figure 2:
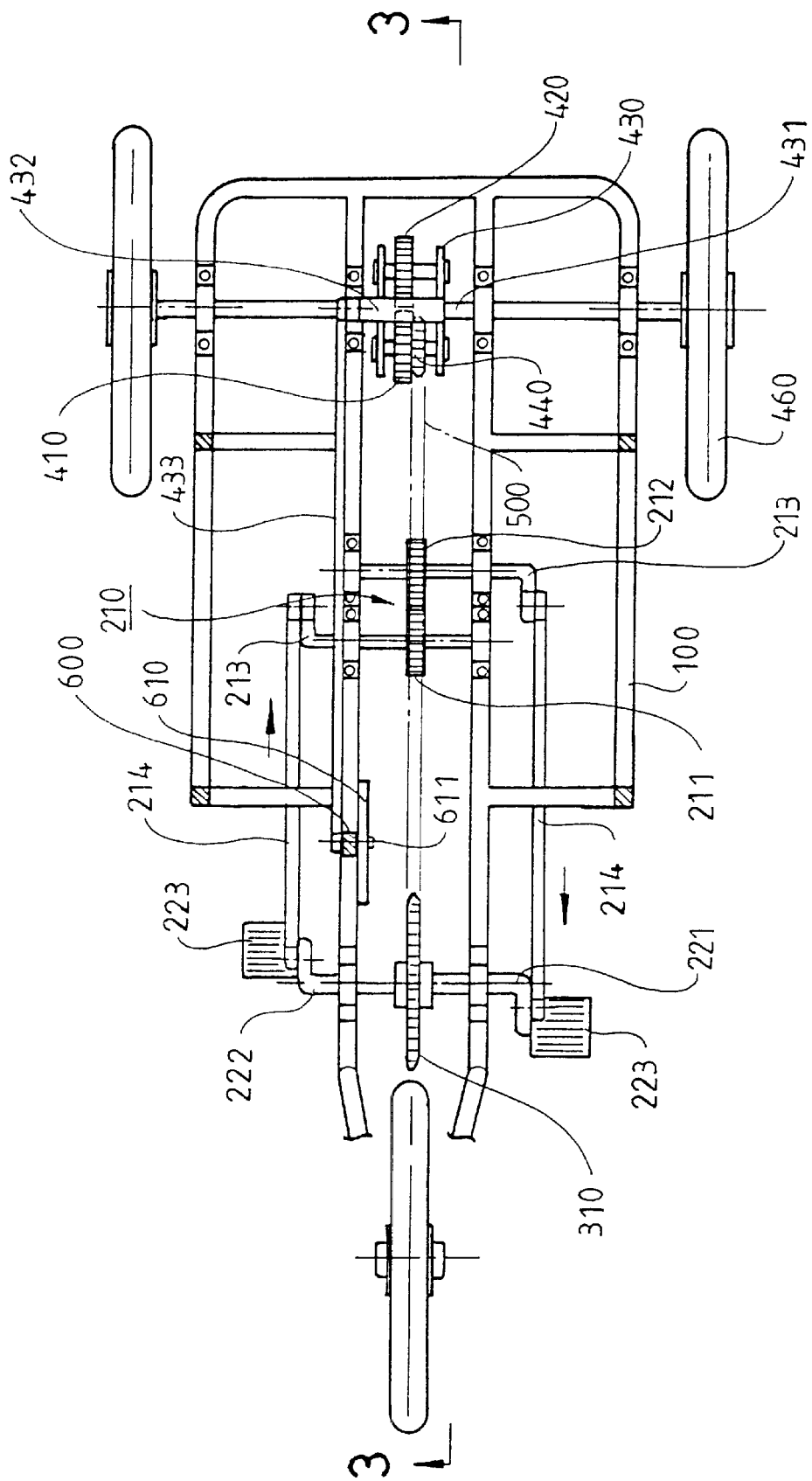
FIG. 2 is a top view of the bicycle transmission assembly.
Figure 3:
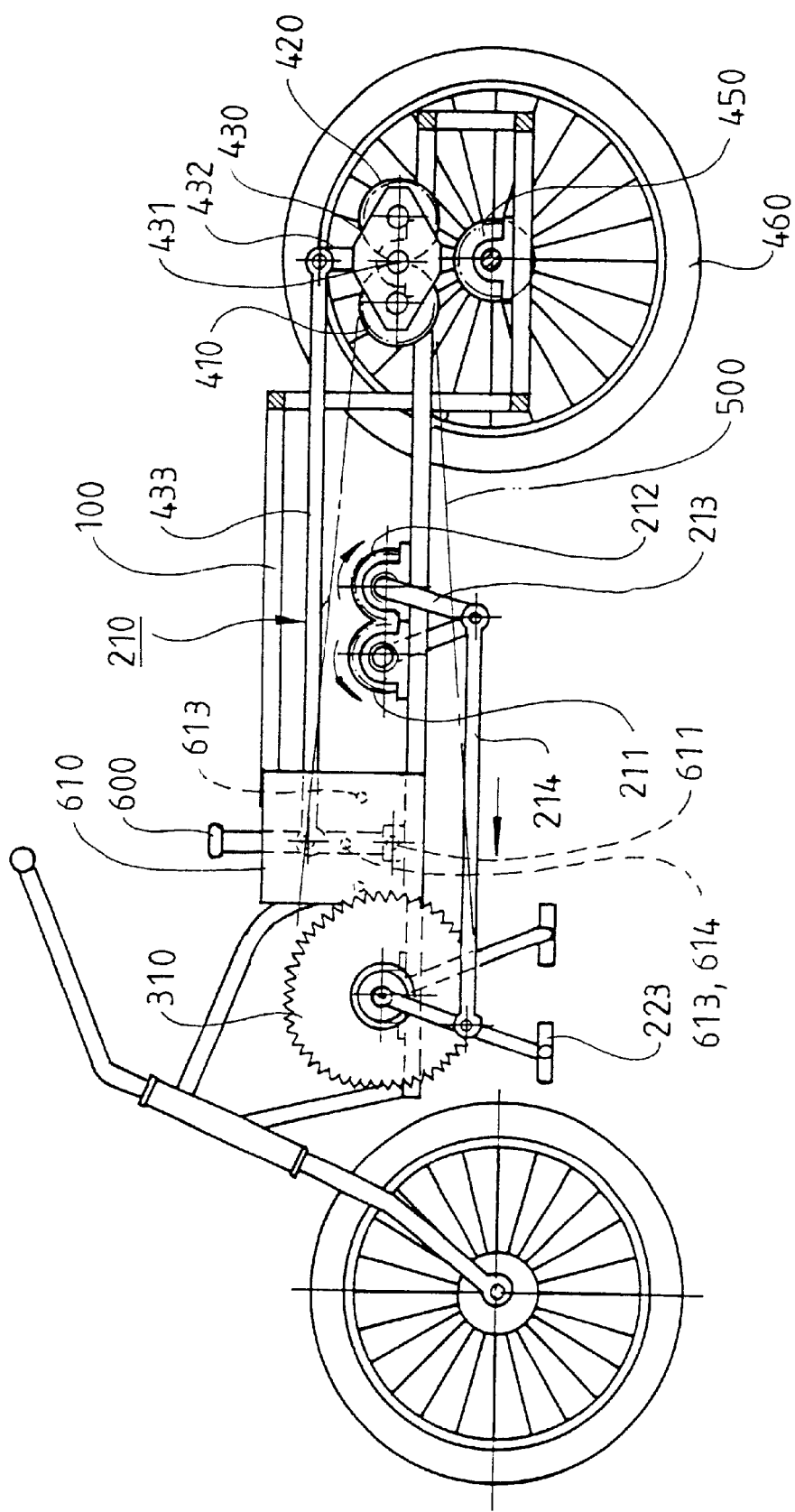
FIG. 3 is a sectional view taken along line 3—3 in FIG. 2.

Referring to FIGS. 1 through 3, a bicycle transmission assembly in accordance with the present invention generally includes a gear shifting device and a reciprocating pedal device mounted to a bicycle frame 100. As shown in FIGS. 1 through 3, the reciprocating pedal device comprises a reverse gear train 210 consisting of a first reverse gear 211 and a second reverse gear 212 that are meshed with each other. Each reverse gear 211, 212 is connected via a torque rod 213 and a link 214 to a mediate portion of an associated pedal rod 221, 222, a pedal 223 being mounted to a distal end of each pedal rod 221, 222. The reverse gears 211 and 212 rotate in reverse directions so as to make the pedal rods 221 and 222 move horizontally and reciprocatingly. Swaying movements of the pedal rods 221 and 222 drive a single direction gear mechanism 310 to make a single direction gear 320 of the single direction gear mechanism 310 rotate in only one direction.

The gear shifting device comprises a first idler gear 410 and a second idler gear 420 that are meshed with each other. In addition, the first idler gear 410 and the second idler gear 420 are carried by a carrier member 430 that includes a shaft 431 rotatably supported by the bicycle frame 100. The carrier member 430 is connected to and thus actuatable by a gear shifting lever 600 via an arm 432 and a link 433. A follower gear 440 is mounted to a shaft (not labeled) to which the first idler gear 410 is securely mounted. The follower gear 440 is connected to the single direction gear 320 of the single direction gear mechanism 310 by a transmission element 500, e.g., a chain, belt, etc.

Figure 5:
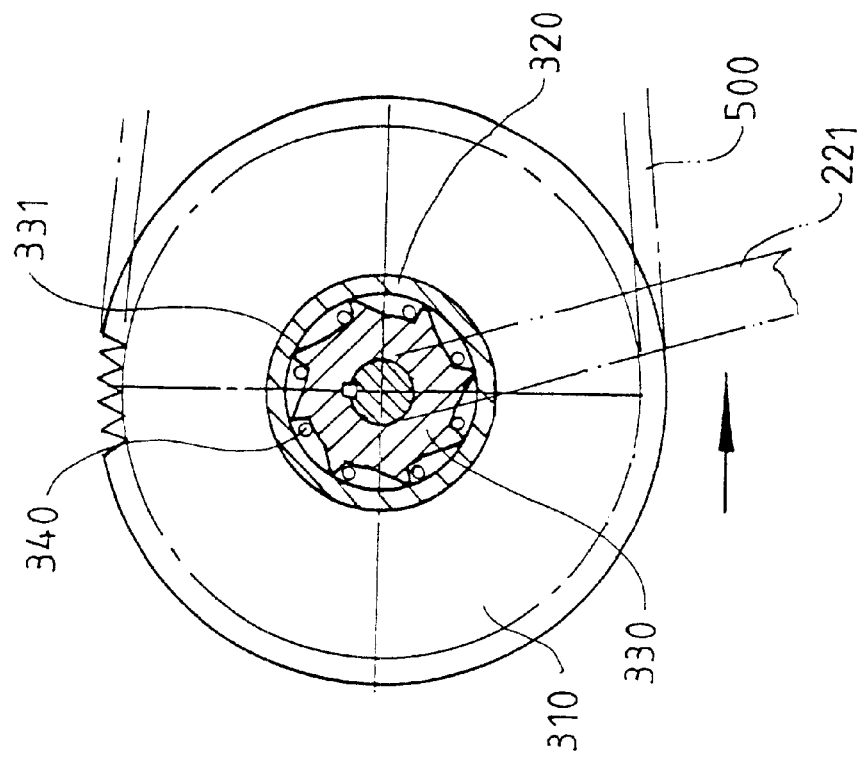
FIG. 5 is a view similar to FIG. 4, illustrating operation in a reverse direction of the pedal.
Figure 4:
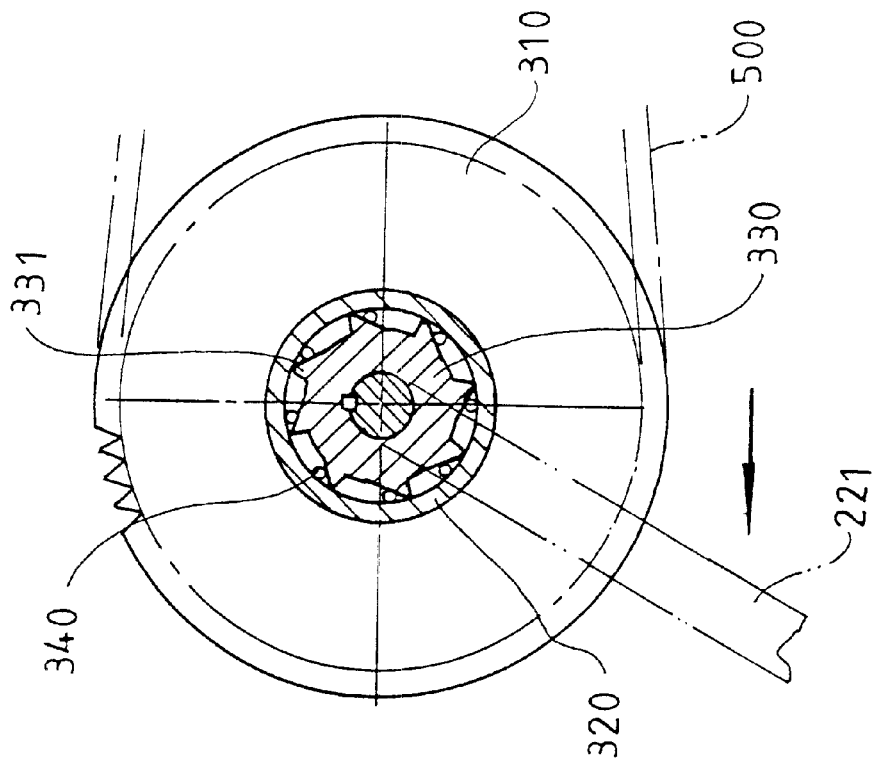
FIG. 4 is an enlarged view, partly sectioned, of a single direction gear mechanism of the bicycle transmission assembly.

Referring to FIGS. 1, 4, and 5, in addition to the single direction gear 320, the single direction gear mechanism 310 includes a ratchet wheel 330 and a plurality of balls 340. When the cyclist pedals the pedal 223 on the pedal rod 221, the ratchet gear 330 rotates clockwise. Since each ratchet tooth 331 of the ratchet gear 330 has a certain slope, each ball 340 is in intimate contact with an inner peripheral surface of the single direction gear 320 when the ratchet wheel 330 rotates clockwise. Thus, the single direction gear 320 rotates clockwise. At the same time, the pedal rod 221 urges the second reverse gear 212 to rotate clockwise via transmission by the link 214 and the torque rod 213. The second reverse gear 212 drives the first reverse gear 211 counterclockwise, which, in turn, cause rearward movement of the other pedal rod 222 via transmission by the other torque rod 213 and the other link 214.

Referring to FIG. 5, when the cyclist pedals the pedal 223 of the other pedal rod 222 forward, the other ratchet wheel 330 rotates clockwise, which, in turn, drives the single direction gear clockwise. By means of transmission of the reverse gears 211 and 212, the pedal rod 221 moves rearward. At this time, the pedal rod 221 drives the ratchet gear 330 counterclockwise. Since each ratchet tooth 331 of the ratchet gear 330 has a certain slope, each ball 340 is disengaged from the ratchet gear 330 and the inner peripheral surface of the single direction gear 320. As a result, the single direction gear 320 is not driven by the ratchet gear 330. Namely, the ratchet gear 330 rotates freely. Thus, by means of continuous pedaling of the pedal rods 221 and 222, the single direction gear 320 always rotates clockwise.

Figure 6:
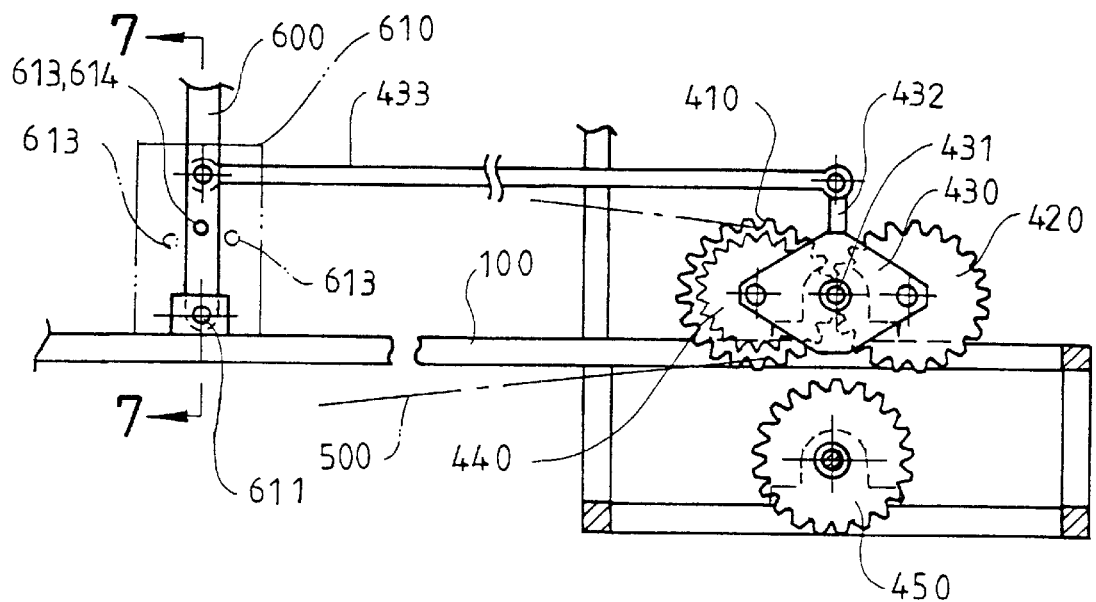
FIG. 6 is a schematic elevational view of a gear shifting device of the bicycle transmission assembly, wherein the gear shifting device is at a neutral gear.
Figure 7:
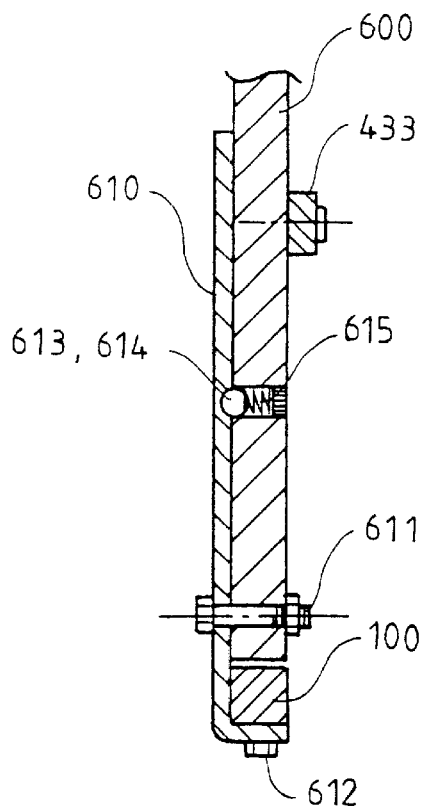
FIG. 7 is a sectional view taken along line 7—7 in FIG. 6.
Figure 8:
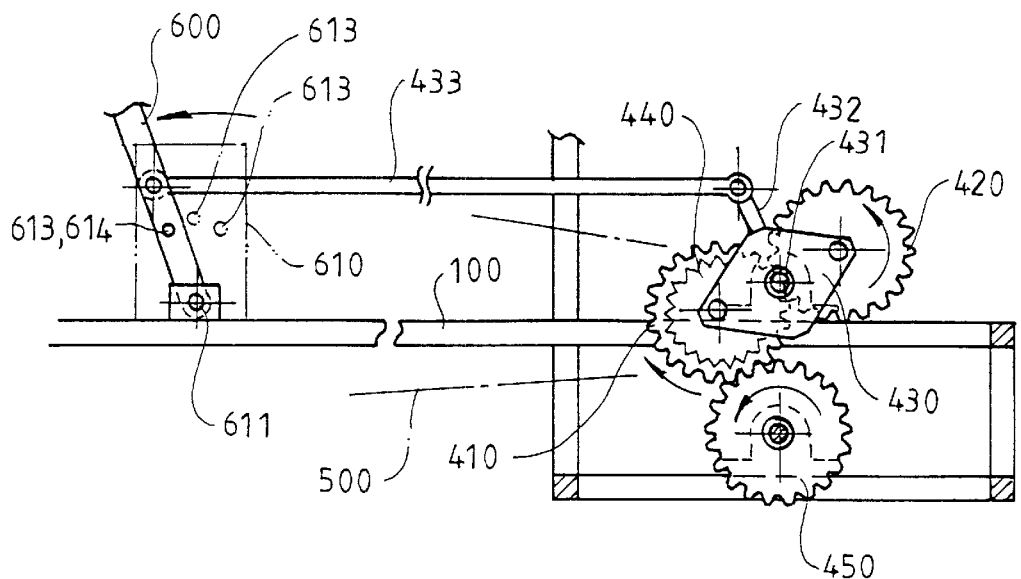
FIG. 8 is a view similar to FIG. 6, wherein the gear shifting device is at a forward gear.
Figure 9:
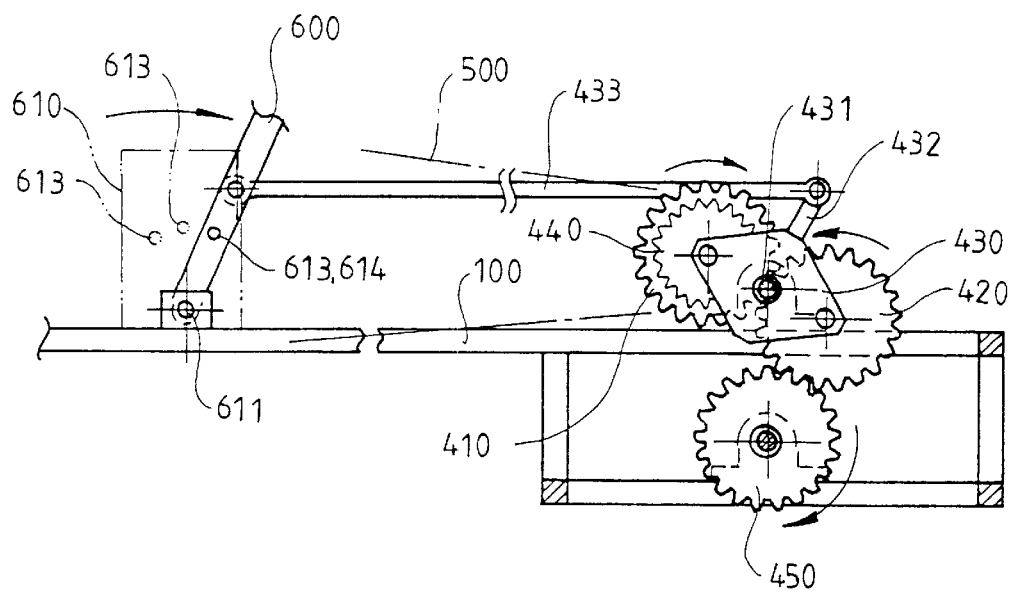
FIG. 9 is a view similar to FIG. 6, wherein the gear shifting device is at a back gear.

Referring to FIGS. 1, 6, and 7, an end of the gear shifting lever 600 is pivotally connected by a bolt 611 or other conventional means to a gear shifting plate 610 that is fixed to the bicycle frame 100 by a screw 612 or other conventional means. The gear shifting plate 610 includes a plurality of engaging holes 613, and the gear shifting lever 600 includes an engaging protrusion 614 biased by a spring 615 to selectively engage with one of the engaging holes 613 upon manually pivoting the gear shifting lever 600 among several positions that correspond to different gear.

When the gear shifting lever 600 is at a position shown in FIG. 7, the bicycle is at a neutral gear, wherein the first idler gear 410 and the second idler gear 420 are both disengaged from the transmission gear 450. Thus, rotational movements of the single direction gear 320 are transmitted to the follower gear 440 via the transmission element such that the idler gears 410 and 420 rotate freely; yet the power is not transmitted to the transmission gear 450.

When the gear shifting lever 600 is shifted forward (FIG. 1) such that the engaging protrusion 614 of the gear shifting lever 600 is engaged with another engaging hole 613 of the gear shifting plate 610, the link 433, the arm 432, and the carrier plate 430 are actuated such that the carrier plate 430 rotates about the axis of its shaft 431 until the first idler gear 410 meshes with the transmission gear 450. Thus, rotational movements of the single direction gear 320 are transmitted to the follower gear 440, the first idler gear 410, and the transmission gear 450. The wheels 460 of the bicycle are driven to move the bicycle forward, as the wheels 460 are coaxially mounted with the transmission gear 450.

When the gear shifting lever 600 is shifted rearward (FIG. 1) such that the engaging protrusion 614 of the gear shifting lever 600 is engaged with another engaging hole 613 of the gear shifting plate 610, the link 433, the arm 432, and the carrier plate 430 are actuated such that the carrier plate 430 rotates about the axis of its shaft 431 until the first idler gear 410 disengages from the transmission gear 450 and the second idler gear 420 meshes with the transmission gear 450. Thus, rotational movements of the single direction gear 320 are transmitted to the follower gear 440, the first idler gear 410, the second idler gear 420, and the transmission gear 450. The wheels 460 of the bicycle are driven to move the bicycle rearward.

Since the single direction gear mechanism 310 outputs power to the wheels 460 under reciprocating movements of the pedal rods 221 and 222 and since the forces exerted to the pedal rods 221 and 222 are outward kicking forces from the cyclist, one of the legs of the cyclist will be moved rearward naturally when the other leg kicks forward, which is very ergonomic. In addition, when at the back gear, the cyclist may turn around his/her body to see the situation behind him/her, thereby having improved safety in addition to leisure and sporting effects.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A bicycle transmission assembly comprising:

a gear shifting device comprising a follower gear, a first idler gear, a second idler gear, and a transmission gear, the follower gear and the first idler gear being coaxially mounted with each other, the first idler gear and the second idler gear being meshed with each other and both mounted to a carrier member, the carrier member being rotatably supported such that the transmission gear is capable of meshing with one of the first idler gear and the second idler gear, the gear shifting device includes a gear shifting plate for fixing to the bicycle frame and a gear shifting lever, the gear shifting plate including a plurality of engaging holes, the gear shifting lever including an engaging protrusion with the end of the gear shifting lever pivotally connected with the gear shifting plate, the engaging protrusion of the gear shifting lever being selectively engaged with one of the engaging holes of the gear shifting plate and thus positioned at one of a neutral gear, a forward gear, and a back gear, the other end of the gear shifting lever being connected to the carrier member of the gear shifting device by a link and an arm, wherein pivotal movement of the gear shifting device controls selective engagement of the transmission gear of the gear shifting device with one of the first idler gear and the second idler gear;

a reciprocating pedal device comprising a single direction gear mechanism, a first pedal rod, and a second pedal rod, the single direction gear mechanism including a single direction gear that is connected to the follower gear by a transmission element; and the gear shifting device and the reciprocating pedal device being adapted to be mounted to a bicycle frame, whereby reciprocating movements of the first pedal rod and the second pedal rod drive the single direction gear to turn, which, in turn, drives the first idler wheel and the second idler wheel via transmission of the transmission element, wherein the bicycle moves forward when the first idler gear meshes with the transmission gear, and wherein the bicycle moves rearward when the second idler gear meshes with the transmission gear.

2. A bicycle transmission assembly comprising:

a gear shifting device comprising a follower gear, a first idler gear, a second idler gear, and a transmission gear, the follower gear and the first idler gear being coaxially mounted with each other, the first idler gear and the second idler gear being meshed with each other and both mounted to a carrier member, the carrier member being rotatably supported such that the transmission gear is capable of meshing with one of the first idler gear and the second idler gear;

a reciprocating pedal device comprising a single direction gear mechanism, a first pedal rod, and a second pedal rod, the single direction gear mechanism including a single direction gear that is connected to the follower gear by a transmission element, the reciprocating pedal device includes a reverse gear train consisting of a first reverse gear and a second reverse gear that are meshed with each other, the first pedal rod of the single direction gear mechanism being connected to the first reverse gear via a first link and a first torque rod, the second pedal rod being connected to the second first reverse gear via a second link and a second torque rod such that the first pedal rod and the second pedal rod moves horizontally and reciprocatingly relative to each other; and the gear shifting device and the reciprocating pedal device being adapted to be mounted to a bicycle frame, whereby reciprocating movements of the first pedal rod and the second pedal rod drive the single direction gear to turn, which, in turn, drives the first idler wheel and the second idler wheel via transmission of the transmission element, wherein the bicycle moves forward when the first idler gear meshes with the transmission gear, and wherein the bicycle moves rearward when the second idler gear meshes with the transmission gear.

* * * * *